(12) United States Patent
Anzenberger et al.

(10) Patent No.: US 10,640,011 B2
(45) Date of Patent: May 5, 2020

(54) SEAT ASSEMBLY HAVING AN EXTENDABLE THIGH SUPPORT

(71) Applicant: Lear Corporation, Southfield, MI (US)

(72) Inventors: Martin Anzenberger, Oberding (DE); Stefan Brunner, Freising (DE); Hady Jabri, Oberding (DE); Michael Menges, Pliening (DE); Josef Widhopf, Oberding (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/205,439

(22) Filed: Nov. 30, 2018

(65) Prior Publication Data
US 2019/0184858 A1    Jun. 20, 2019

Related U.S. Application Data

(60) Provisional application No. 62/599,926, filed on Dec. 18, 2017.

(30) Foreign Application Priority Data

Oct. 24, 2018  (DE) ........................ 10 2018 218 197

(51) Int. Cl.
| | | |
|---|---|---|
| *B60N 2/02* | (2006.01) | |
| *B60N 2/18* | (2006.01) | |
| *B60N 2/62* | (2006.01) | |
| *B60N 2/68* | (2006.01) | |
| *A47C 7/50* | (2006.01) | |

(52) U.S. Cl.
CPC ............ *B60N 2/0284* (2013.01); *B60N 2/62* (2013.01); *B60N 2/686* (2013.01); *A47C 7/5062* (2018.08); *B60N 2002/0236* (2013.01)

(58) Field of Classification Search
CPC ........ B60N 2/0284; B60N 2/62; B60N 2/686; B60N 2002/0236
USPC ..................................... 297/284.11
See application file for complete search history.

(56) References Cited

U.S. PATENT DOCUMENTS

| | | | | |
|---|---|---|---|---|
| 4,491,365 A | * | 1/1985 | Murakami | B60N 2/62 |
| | | | | 297/284.11 |
| 5,988,748 A | * | 11/1999 | Morrison | B60N 2/0232 |
| | | | | 297/284.11 X |
| 6,010,195 A | * | 1/2000 | Masters | B60N 2/0232 |
| | | | | 297/284.11 X |
| 7,192,087 B2 | * | 3/2007 | Adragna | B60N 2/62 |
| | | | | 297/284.11 X |
| 7,669,928 B2 | | 3/2010 | Snyder | |
| 7,669,929 B2 | * | 3/2010 | Simon | B60N 2/0224 |
| | | | | 297/284.11 |
| 7,874,621 B2 | * | 1/2011 | Gumbrich | B60N 2/0284 |
| | | | | 297/284.11 |
| 7,997,648 B2 | * | 8/2011 | Becker | B60N 2/0284 |
| | | | | 297/284.11 |

(Continued)

FOREIGN PATENT DOCUMENTS

DE    102005052345 A1    5/2007

*Primary Examiner* — Rodney B White
(74) *Attorney, Agent, or Firm* — Brooks Kushman PC

(57) ABSTRACT

A seat assembly having an extendable thigh support. The extendable thigh support may include an attachment sled that may be moveably disposed on a lower guide and a seat cushion extension sled that may be moveably disposed on an upper guide. A linkage mechanism may operatively connect the attachment sled to the seat cushion extension sled.

20 Claims, 9 Drawing Sheets

(56) References Cited

U.S. PATENT DOCUMENTS

| | | | | |
|---|---|---|---|---|
| 8,016,355 B2* | 9/2011 | Ito | ............................ | B60N 2/62 |
| | | | | 297/284.11 |
| 8,162,397 B2 | 4/2012 | Booth et al. | | |
| 8,272,687 B2* | 9/2012 | Gross | .................... | B60N 2/4221 |
| | | | | 297/284.11 X |
| 8,393,681 B2* | 3/2013 | Gross | ................. | B60N 2/42763 |
| | | | | 297/284.11 |
| 9,016,785 B2* | 4/2015 | Freisleben | ............ | B60N 2/0232 |
| | | | | 297/284.11 |
| 9,278,636 B2 | 3/2016 | Duncan et al. | | |
| 9,981,582 B2* | 5/2018 | Line | .......................... | B29C 43/18 |
| 10,046,681 B2* | 8/2018 | Line | ...................... | B60N 2/0284 |
| 10,081,279 B2* | 9/2018 | Line | .......................... | B60N 2/68 |
| 10,266,073 B2* | 4/2019 | Line | ...................... | B60N 2/0232 |
| 2001/0022460 A1* | 9/2001 | Kondo | .................. | B60N 2/1839 |
| | | | | 297/284.11 |
| 2009/0091172 A1* | 4/2009 | Kim | ..................... | B60N 2/0284 |
| | | | | 297/337 |
| 2014/0145482 A1* | 5/2014 | Holzhueter | .............. | A47C 3/00 |
| | | | | 297/313 |
| 2014/0292051 A1* | 10/2014 | Planson | ................ | B60N 2/0232 |
| | | | | 297/337 |
| 2016/0339806 A1* | 11/2016 | Popescu | ................ | B60N 2/0284 |
| 2016/0339820 A1* | 11/2016 | Kajino | .................... | B60N 2/995 |
| 2017/0267141 A1* | 9/2017 | Line | .......................... | B60N 2/62 |
| 2017/0291520 A1* | 10/2017 | Line | .......................... | B29C 43/18 |
| 2017/0291522 A1* | 10/2017 | Line | .......................... | B60N 2/62 |
| 2017/0291523 A1* | 10/2017 | Line | ...................... | B60N 2/0232 |
| 2018/0065508 A1* | 3/2018 | Line | ...................... | B60N 2/0232 |
| 2018/0099595 A1* | 4/2018 | Kondrad | ................. | B60N 2/929 |
| 2019/0135139 A1* | 5/2019 | Ioppolo | ................ | B60N 2/0284 |
| 2019/0160990 A1* | 5/2019 | Morrow | ................... | B60N 2/72 |

* cited by examiner

SEAT ASSEMBLY HAVING AN EXTENDABLE THIGH SUPPORT

CROSS-REFERENCE TO RELATED APPLICATIONS

This application claims the benefit of U.S. provisional application Ser. No. 62/599,926, filed Dec. 18, 2017, the disclosure of which is hereby incorporated in its entirety by reference herein.

TECHNICAL FIELD

This disclosure relates to a seat assembly having an extendable thigh support. The extendable thigh support may be disposed on a seat bottom of the seat assembly and may be movable between a retracted position and an extended position.

BACKGROUND

A vehicle seat having an adjustable thigh support is disclosed in U.S. Pat. No. 7,669,928.

SUMMARY

In at least one embodiment, a seat assembly is provided. The seat assembly may include a seat bottom and an extendable thigh support. The seat bottom may have a seat bottom frame that may include a seat pan. The extendable thigh support may be moveably disposed on the seat pan. The extendable thigh support may include a lower guide, an upper guide, an attachment sled, a seat cushion extension sled, and a linkage mechanism. The lower guide may be mounted to a bottom side of the seat pan. The upper guide may be mounted to a top side of the seat pan. The attachment sled may be moveably disposed on the lower guide. The seat cushion extension sled may be moveably disposed on the upper guide. The linkage mechanism may operatively connect the attachment sled to the seat cushion extension sled. At least a portion of the linkage mechanism may be rotatable about a first linkage axis.

In at least one embodiment, a seat assembly is provided. The seat assembly may include a seat bottom, an extendable thigh support, a seat bottom cushion, and a trim cover. The seat bottom may have a seat bottom frame. The extendable thigh support may be moveably disposed on the seat bottom frame. The extendable thigh support may include a lower guide, an attachment sled, an upper guide, a seat cushion extension sled, and a linkage mechanism. The lower guide may be disposed on the seat bottom frame. The attachment sled may be moveably disposed on the lower guide. The upper guide may be disposed on the seat bottom frame. The seat cushion extension sled may be disposed on the upper guide and may be movable between a retracted position and an extended position. The linkage mechanism may operatively connect the attachment sled to the seat cushion extension sled. The seat bottom cushion may be disposed on the extendable thigh support. The trim cover may extend over the seat bottom cushion. The trim cover may be attached to the attachment sled.

BRIEF DESCRIPTION OF THE DRAWINGS

FIG. 3 is a perspective view of the extendable thigh support and a portion of the seat bottom frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
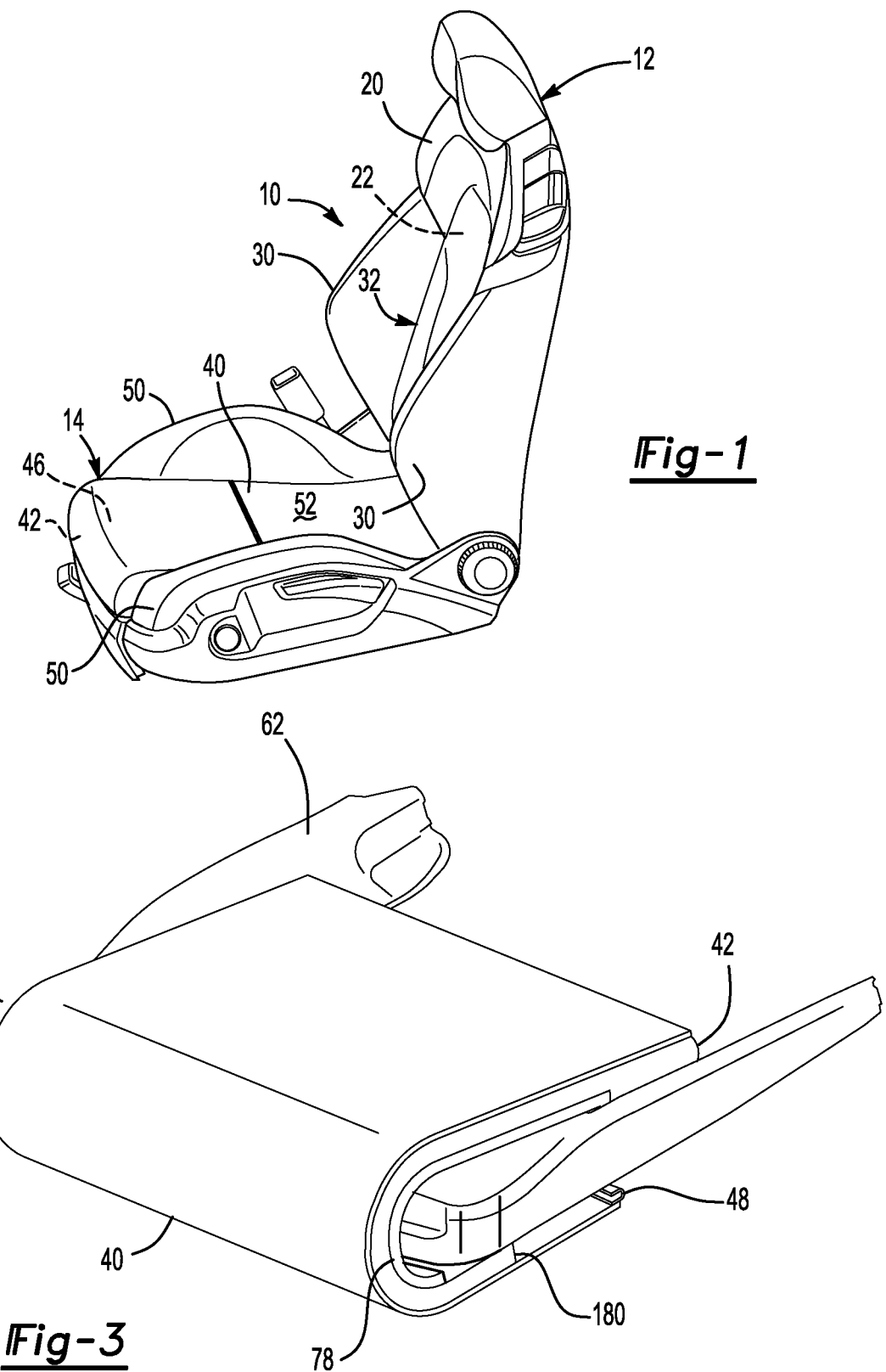
FIG. 1 is a perspective view of a seat assembly.

Referring to FIG. 1, an example of a seat assembly 10 is shown. The seat assembly 10 may be configured for use in a vehicle, such as a motor vehicle like a car or truck. In addition, the seat assembly 10 may also be configured for non-vehicular applications. The seat assembly 10 may include a seat back 12 and a seat bottom 14.

The seat back 12 may be configured to support the back of a seat occupant. The seat back 12 may be pivotable about an axis with respect to the seat bottom 14. For example, one or more recliner mechanisms may pivotally connect the seat back 12 to the seat bottom 14 in a manner known by those skilled in the art. The seat back 12 may include a seat back trim cover 20, a seat back cushion 22, and a seat back frame.

The seat back trim cover 20 may be disposed over or upon the seat back cushion 22 and may form or provide at least a portion of a visible exterior surface of the seat back 12. The seat back trim cover 20 may include a plurality of trim panels that may be assembled in any suitable manner, such as by stitching. In addition, the seat back trim cover 20 may be made of any suitable material or materials, such as fabric, leather, vinyl, carpet, or combinations thereof. The seat back trim cover 20 may be secured to the seat back frame with one or more retention features, such as a trim clip, hog ring, hook and loop fastener like as Velcro®, or the like.

The seat back cushion 22 may be at least partially concealed by the seat back trim cover 20 and may be directly or indirectly supported by the seat back frame. The seat back cushion 22 may be made of any suitable material, such as foam. The seat back cushion 22 may include or help define a pair of side bolsters 30 and a seating region 32.

The side bolsters 30 may generally extend along opposing lateral sides of the seat back 12 and may extend between the top side and bottom side of the seat back cushion 22. As such, the side bolsters 30 may be disposed along opposite sides of the seating region 32 and may extend outwardly or forwardly from the seating region 32 toward a seat occupant.

The seating region 32 may be configured to support the back of a seat occupant. The seating region 32 may be disposed between the side bolsters 30 and may extend between the top and bottom of the seat back cushion 22.

The seat back frame may provide structural support for the seat back 12 and may facilitate mounting of various components to the seat back 12. The seat back frame may be made of any suitable material. For example, the seat back frame may be made of a polymeric material, metal, fiber reinforced material, or combinations thereof. The seat back frame may be at least partially disposed under the seat back trim cover 20, the seat back cushion 22, or both.

Figure 2:
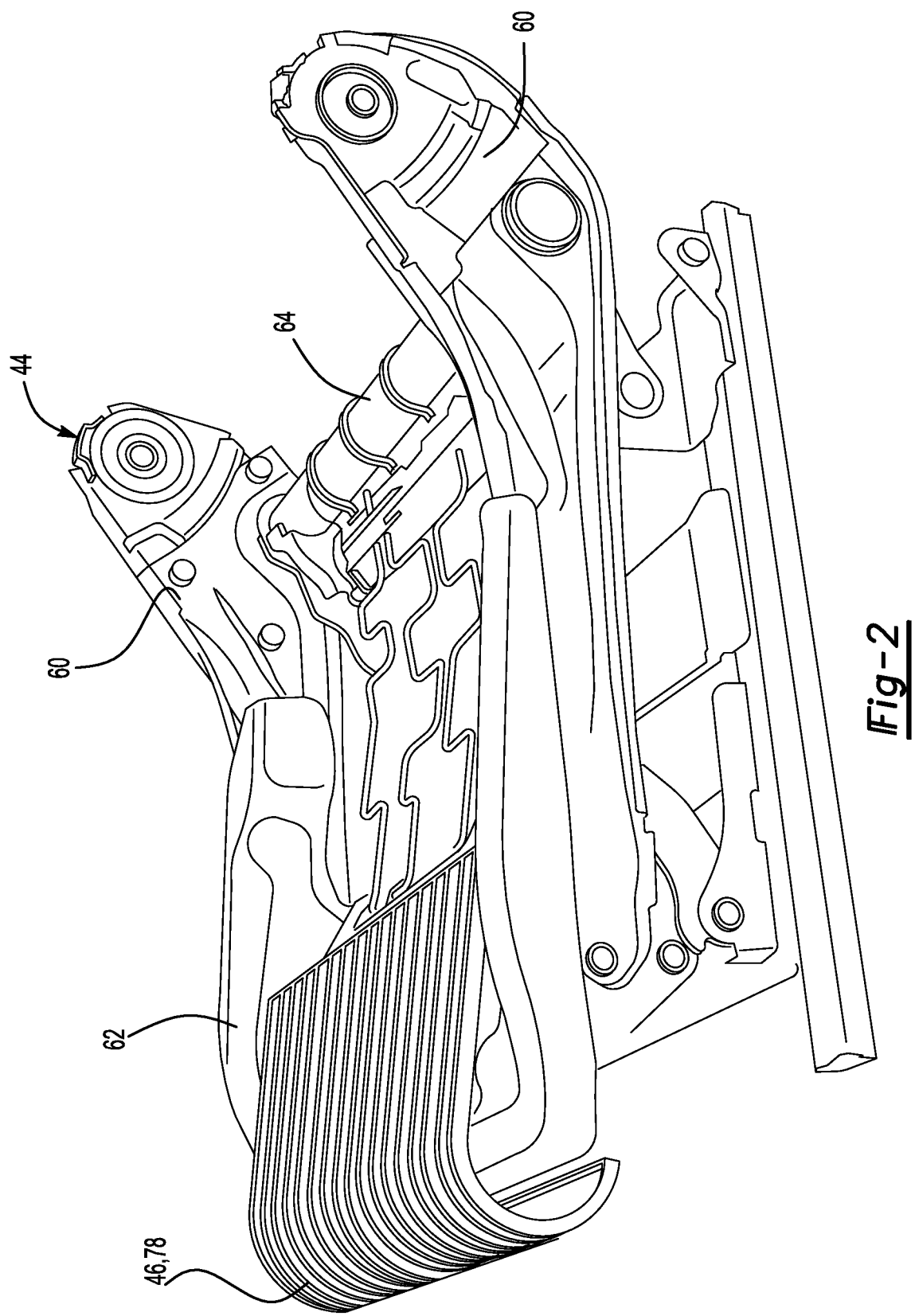
FIG. 2 is a perspective view of a seat bottom frame having an extendable thigh support.

Referring to FIGS. 1 and 2, the seat bottom 14 may be configured to support a seat occupant. In a vehicular application, the seat bottom 14 may be fixedly or moveably mounted to a support surface, such as a vehicle floor. In at least one configuration, the seat bottom 14 may include a seat bottom trim cover 40, a seat bottom cushion 42, a seat bottom frame 44, and an extendable thigh support 46.

Figure 7A:
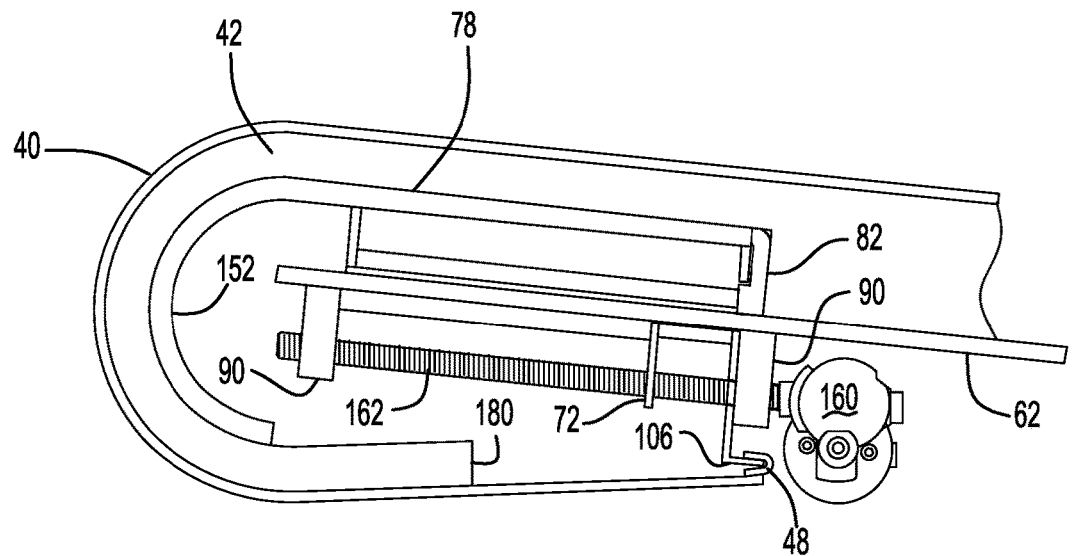
FIGS. 7a and 7b are side views of the extendable thigh support in a retracted position and an extended position, respectively.
Figure 7B:
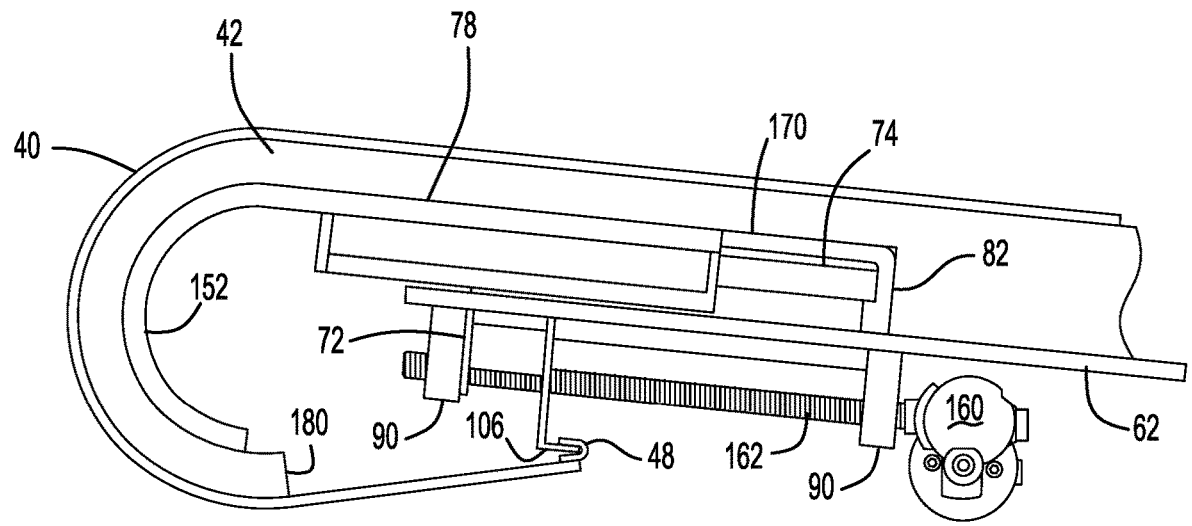

The seat bottom trim cover 40 may be disposed over or upon the seat bottom cushion 42 and may form or provide at least a portion of a visible exterior surface of the seat bottom 14. Moreover, a seat occupant may be disposed on the seat bottom trim cover 40 when in a seated position. The seat bottom trim cover 40 may include a plurality of trim panels that may be assembled in any suitable manner, such as by stitching. In addition, the seat bottom trim cover 40 may be made of any suitable material or materials, such as fabric, leather, vinyl, carpet, or combinations thereof. The seat bottom trim cover 40 may be secured to the seat bottom frame 44, the extendable thigh support 46, or both, with one or more retention features 48, such as a trim clip, hog ring, hook and loop fastener like as Velcro®, or the like. As is best shown in FIGS. 3, 7a and 7b, an example of a retention feature 48 is shown that is configured as a clip that secures the seat bottom trim cover 40 to the extendable thigh support 46.

Referring to FIG. 1, the seat bottom cushion 42 may be at least partially concealed by the seat bottom trim cover 40 and may be directly or indirectly supported by the seat bottom frame 44. The seat bottom cushion 42 may be made of any suitable material, such as foam. In addition, the seat bottom cushion 42 may include or help define a pair of side bolsters 50 and a center seating region 52.

The side bolsters 50 may generally extend along opposing lateral sides of the seat bottom 14 and may extend between the front side and back side of the seat bottom cushion 42. As such, the side bolsters 50 may be disposed along opposite sides of the center seating region 52 and the extendable thigh support 46 and the side bolsters 50 may extend upward from the center seating region 52 toward a seat occupant.

The center seating region 52 may be configured to support the posterior and thighs of a seat occupant. The center seating region 52 may be disposed between the side bolsters 50 and may extend between the front and back of the seat bottom cushion 42. The center seating region 52 may be partially defined by the extendable thigh support 46.

Referring to FIGS. 2 and 3, the seat bottom frame 44 may provide structural support for the seat bottom 14 and may facilitate mounting of various components to the seat bottom 14. The seat bottom frame 44 may be made of any suitable material. For example, the seat bottom frame 44 may be made of a polymeric material, metal, fiber reinforced material, or combinations thereof. The seat bottom frame 44 may be at least partially disposed under the seat bottom trim cover 40, seat bottom cushion 42, or both. In the configuration shown, the seat bottom frame 44 includes a pair of lateral side members 60, a seat pan 62, and one or more cross members 64.

The lateral side members 60 may be spaced apart from each other and may be disposed along opposing lateral sides or left and right sides of the seat bottom frame 44. The lateral side members 60 may generally extend from the rear of the seat bottom frame 44 toward the front of the seat bottom frame 44.

The seat pan 62 may be mounted to the lateral side member 60. The seat pan 62 may be disposed at or near the front of the seat bottom frame 44 and may extend between and may interconnect the lateral side members 60. The seat pan 62 may be fixedly positioned with respect to the lateral side members 60. As is best shown in FIG. 4, the seat pan 62 may have a bottom side 66 that may face downward or away from the center seating region 52 and a top side 68 that may face upward or toward the center seating region 52.

Referring to FIG. 2, one or more cross members 64 may be provided with the seat bottom frame 44. In FIG. 2, a cross member 64 is shown that may be disposed near the rear of the seat bottom frame 44 and may be generally disposed below the seat back 12. In at least one configuration, the cross member(s) 64 may be spaced apart from the seat pan 62 and may extend between and may interconnect the lateral side members 60. A suspension mat or wires may extend from the cross member 64 to the seat pan 62 to help provide flexible support for the seat bottom cushion 42.

Figure 4:
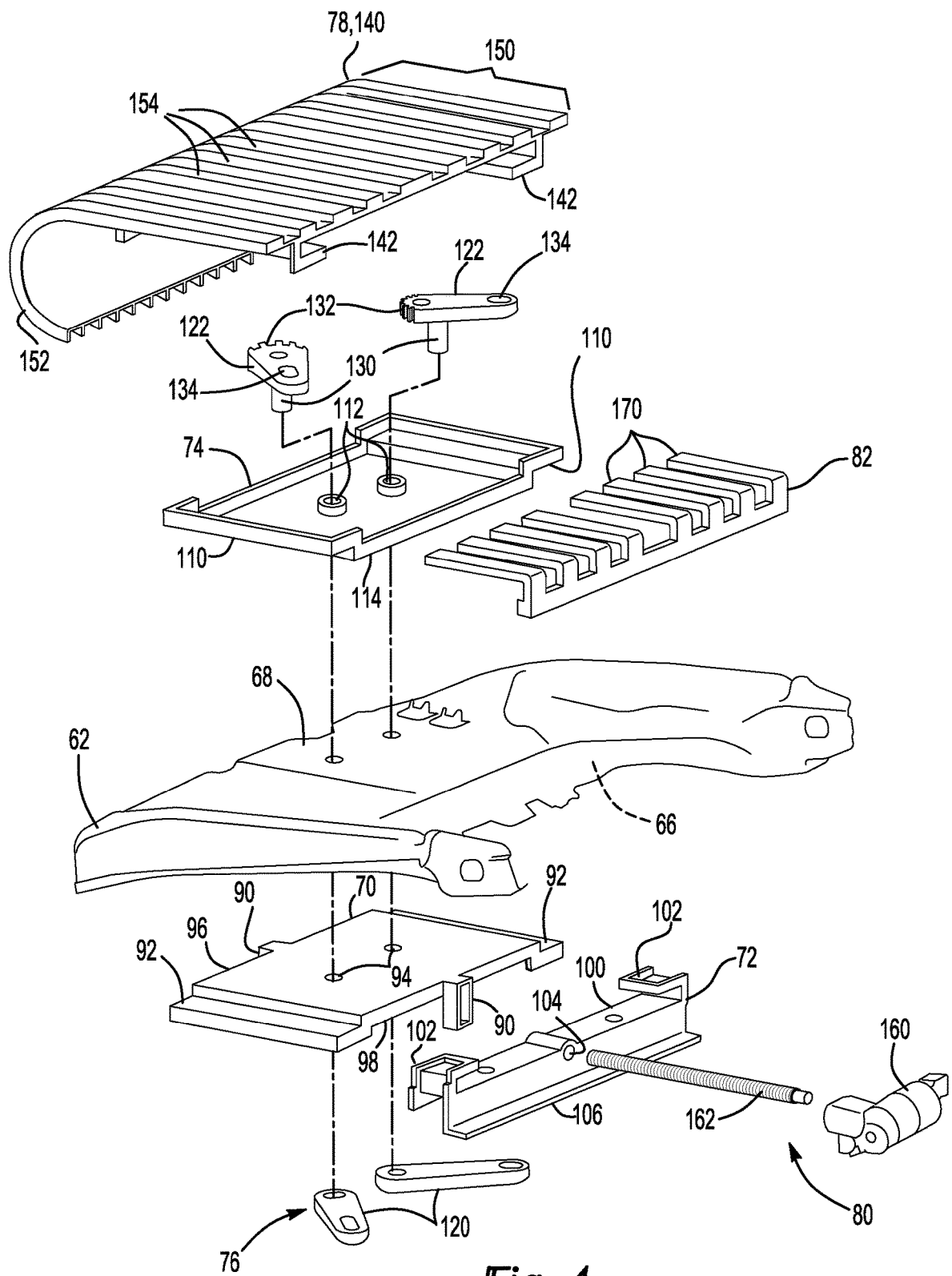
FIG. 4 is an exploded view of FIG. 3 with a seat bottom cushion and a seat bottom trim cover omitted for clarity.

Referring to FIGS. 2-4, the extendable thigh support 46 may support the thighs of a seat occupant. The extendable thigh support 46 may be located near the front of the seat bottom frame 44 and may be moveable with respect to the seat bottom frame 44. For example, the extendable thigh support 46 may be moveably disposed on the seat bottom frame 44 adjacent to the seat pan 62 and may move between a retracted position and an extended position as will be discussed in more detail below. In at least one configuration such as is shown in FIG. 4, the extendable thigh support 46 may include a lower guide 70, an attachment sled 72, an upper guide 74, a linkage mechanism 76, a seat cushion extension sled 78, an actuator mechanism 80, and a gap cover 82.

Figure 6:
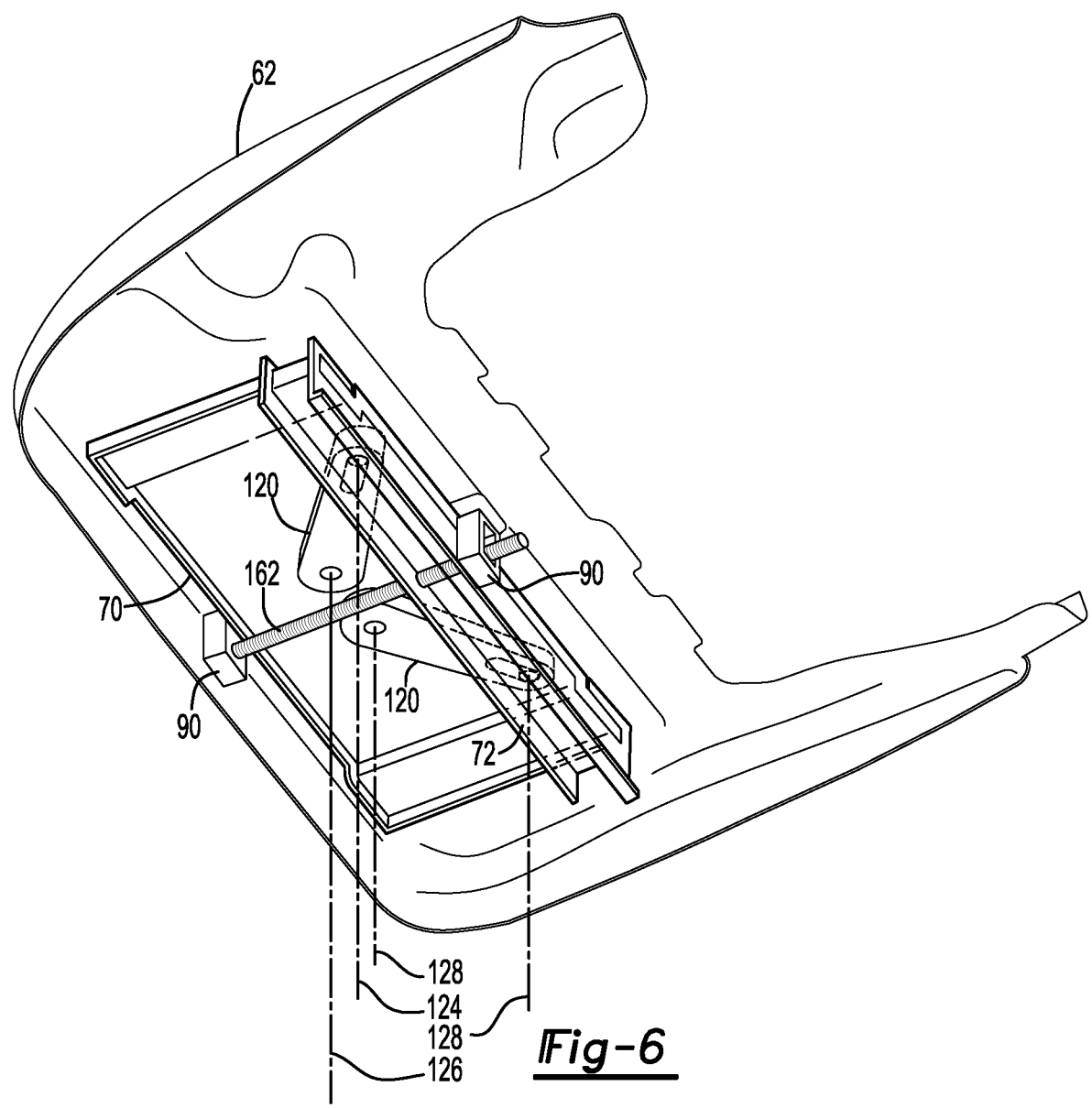
FIG. 6 is a bottom perspective view showing of another portion of the extendable thigh support.

Referring to FIGS. 4 and 6, the lower guide 70 may be mounted to the seat bottom frame 44. For example, the lower guide 70 may be fixedly positioned with respect to the seat pan 62 and may be mounted underneath the seat pan 62. As such, the lower guide 70 may be mounted to the bottom side 66 of the seat pan 62. In at least one configuration, the lower guide 70 may include one or more spindle mounts 90, one or more guide tracks 92, and one or more holes 94.

One or more spindle mounts 90 may extend from the lower guide 70 and may facilitate mounting of a spindle of the actuator mechanism 80. In the configuration shown, a pair of spindle mounts 90 are provided that extend away from the bottom side 66 of the seat pan 62. A first spindle mount 90 may be located proximate a front side 96 of the lower guide 70. A second spindle mount 90 may be located opposite the first spindle mount 90 and may be located proximate the rear side 98 of the lower guide 70. The spindle mounts 90 may each have a hole that may receive the spindle as will be discussed in more detail below.

One or more guide tracks 92 may be provided with the lower guide 70 to guide movement of the attachment sled 72 along the lower guide 70. In the configuration shown, two guide tracks 92 are provided that may be located along or disposed on opposite lateral sides of the lower guide 70. The guide tracks 92 may extend between the front side 96 of the lower guide 70 and the rear side 98 of the lower guide 70. The guide tracks 92 may be offset from a center portion of the lower guide 70 that may be coupled to the seat pan 62. For example, the guide tracks 92 may be offset downwardly and may be spaced apart from the seat pan 62 to facilitate attachment and movement of the attachment sled 72. It is also contemplated that the guide tracks 92 may be omitted or may not be offset in one or more embodiments where there is sufficient clearance between the seat pan 62 and the lower guide 70 to facilitate mounting and movement of the attachment sled 72.

One or more holes 94 may extend through the lower guide 70. The holes 94 may facilitate mounting of the linkage mechanism 76. In the configuration shown, two holes 94 are provided that are located near the center of the lower guide 70 but are offset or disposed on opposite lateral sides with respect to the spindle.

Referring to FIGS. 4, 7a, 7b, 10a and 10b, the attachment sled 72 may be moveably disposed on the lower guide 70. The attachment sled 72 may interconnect the actuator mechanism 80 and linkage mechanism 76. In at least one configuration such as is shown in FIG. 4, the attachment sled 72 may include a body 100 and one or more hook portions 102.

The body 100 may extend underneath the lower guide 70. For example, the body 100 may extend in a lateral direction across the lower guide 70 and may be longitudinally positioned between the spindle mounts 90. As such, the spindle mounts 90 may act as stops that may limit movement of the attachment sled 72 in a fore/aft (front/back) direction. The body 100 may also include a spindle hole 104 and a trim attachment flange 106.

The spindle hole 104 may receive of spindle of the actuator mechanism 80. The spindle hole 104 may be configured as a through hole and may be threaded in one or more configurations.

The trim attachment flange 106 may facilitate mounting of the seat bottom trim cover 40 to the attachment sled 72. The trim attachment flange 106 may extend downward from the body 100. In at least one configuration, the trim attachment flange 106 may have an L-shaped cross-section and may extend downward and rearward.

One or more hook portions 102 may extend from the body 100. In the configuration shown, two hook portions 102 are provided. The hook portions 102 may extend from opposite lateral sides of the body 100 and may couple the attachment sled 72 to the lower guide 70. For instance, each hook portion 102 may wrap around a lateral side of the lower guide 70 and may be received in a corresponding guide track 92 of the lower guide 70. As such, the hook portions 102 may cooperate with the body 100 to secure the attachment sled 72 to the lower guide 70 and limit or constrain vertical movement of the attachment sled 72 with respect to the lower guide 70.

Figure 5:
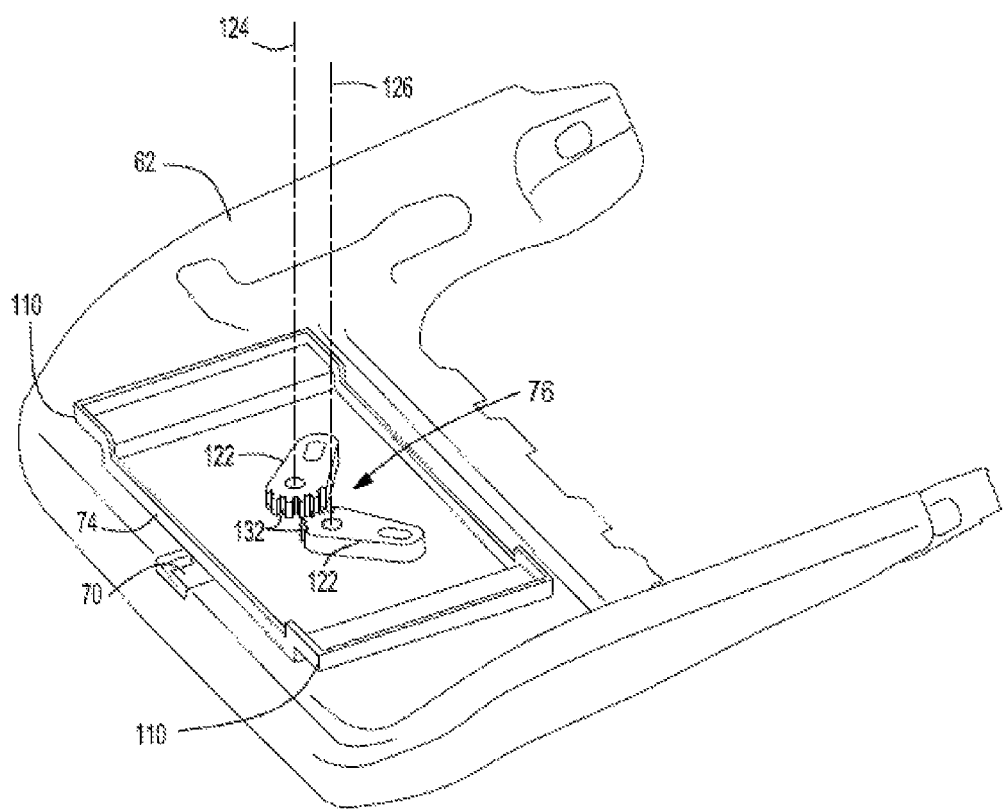
FIG. 5 is a top perspective view showing of a portion of the extendable thigh support.

Referring to FIGS. 4 and 5, the upper guide 74 may be mounted to the seat bottom frame 44. For example, the upper guide 74 may be fixedly positioned with respect to the seat pan 62 and may be mounted on the top side 68 of the seat pan 62. In addition, the upper guide 74 may be located underneath the seat cushion extension sled 78 as is best shown in FIG. 7b. In at least one configuration, the upper guide 74 may include one or more guide tracks 110 and one or more holes 112.

One or more guide tracks 110 may be provided with the upper guide 74 to guide movement of the seat cushion extension sled 78 along the upper guide 74. In the configuration shown, first and second guide tracks 110 are shown that may be located along or may be disposed on opposite lateral sides of the upper guide 74. The guide tracks 110 may extend between a front side of the upper guide 74 and the rear side of the upper guide 74. The guide tracks 110 may be offset from a center portion 114 of the upper guide 74 that may be coupled to the seat pan 62. For example, the guide tracks 110 may be offset upwardly and may be spaced apart from the seat pan 62 to facilitate attachment and movement of the seat cushion extension sled 78. It is also contemplated that the guide tracks 110 may be omitted or may not be offset in one or more embodiments where there is sufficient clearance between the seat pan 62 and the upper guide 74 to facilitate mounting and movement of the seat cushion extension sled 78.

One or more holes 112 may extend through the upper guide 74. The holes 112 may facilitate mounting of the linkage mechanism 76. A hole 112 in the upper guide 74 may be aligned with a corresponding hole 94 in the lower guide 70.

Referring to FIG. 4, the linkage mechanism 76 may operatively connect the attachment sled 72 to the seat cushion extension sled 78. The linkage mechanism 76 may transmit movement of the attachment sled 72 to the seat cushion extension sled 78 to move the seat cushion extension sled 78. In at least one configuration, the linkage mechanism 76 may include one or more lower levers 120 and one or more upper levers 122.

Referring to FIGS. 4, 6, 10a and 10b, one or more lower levers 120 may be rotatably disposed on the lower guide 70. For example, one lower lever 120 may be rotatable about a first linkage axis 124 and another lower lever 120 may be rotatable about a second linkage axis 126 with respect to the lower guide 70. The lower levers 120 may be operatively connected to the attachment sled 72 and may be actuated by the attachment sled 72, which in turn may be actuated by the actuator mechanism 80. The lower levers 120 may actuate the upper levers 122. In the configuration shown, two lower levers 120 are provided that may be disposed proximate a bottom side of the lower guide 70 that may face away from and may be disposed opposite the seat pan 62. Each lower lever 120 may have a first end and a second end. The first end may be rotatably mounted to the attachment sled 72, such as with a pin or shaft. For example, the first end may define a slot that may be elongated and may receive the pin or shaft. The first end may be rotatably coupled to the attachment sled 72 along a second axis 128 along which the pin or shaft may extend. The slot may permit the pin or shaft to move with respect to the slot to facilitate smooth movement of the extendable thigh support 46. The second end may be disposed opposite the first end and may be connected to a corresponding upper lever 122 as will be discussed in more detail below. The second end may be rotatable about a corresponding linkage axis. The lower levers 120 may be spaced apart from each other and may be spaced apart from the actuator mechanism 80 and the spindle in one or more configurations.

Referring to FIGS. 4, 5, 9a, and 9b, one or more upper levers 122 may be rotatably disposed on the upper guide 74. In the configuration shown, two upper levers 122 may be provided and may be located on the top side of the upper guide 74 between the upper guide 74 and the seat cushion extension sled 78. One upper lever 122 may be rotatable about the first linkage axis 124 and another upper lever 122 may be rotatable about the second linkage axis 126. The upper levers 122 may be operatively connected to the seat cushion extension sled 78 and may be actuated by the lower levers 120. For example, an upper lever 122 may be coupled to a corresponding lower lever 120, such as with a linkage 130 like a rod or shaft as is best shown in FIG. 4. In the configuration shown, the linkage 130 is integrally formed with the upper lever 122; however, it is contemplated that the linkage 130 may be integrally formed with a lower lever 120 or may be provided as a separate component. The linkage 130 may extend through a hole 94 in the lower guide 70, the seat pan 62, and a hole 112 in the upper guide 74. Each linkage 130 may define or extend along a linkage axis about which a lower lever 120 and a corresponding upper lever 122 may rotate, such as the first linkage axis 124 or the second linkage axis 126.

Figure 8B:
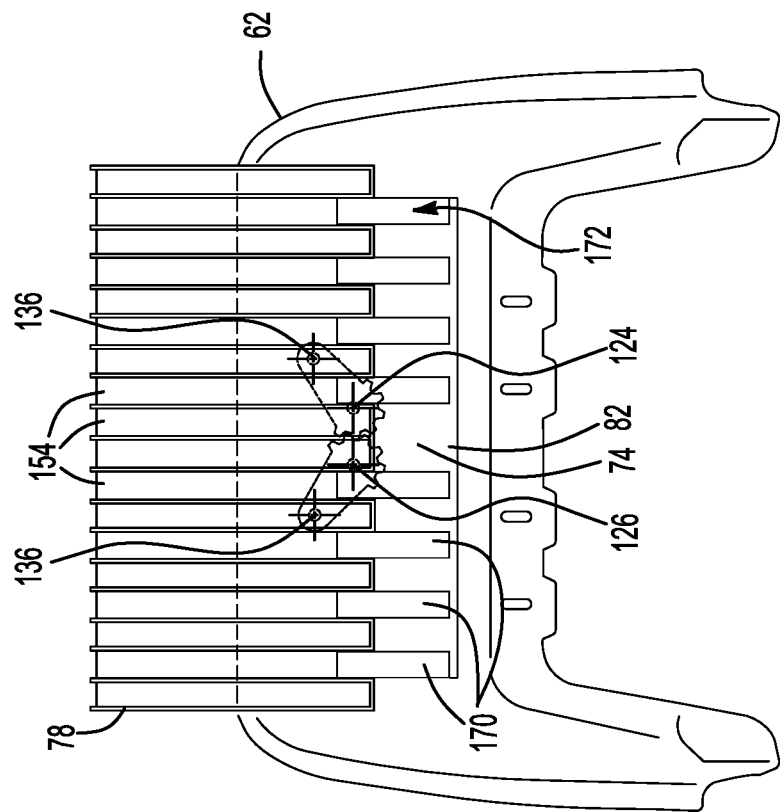
FIGS. 8a and 8b are top views showing a gap cover and the extendable thigh support in the retracted and extended positions, respectively.
Figure 8A:
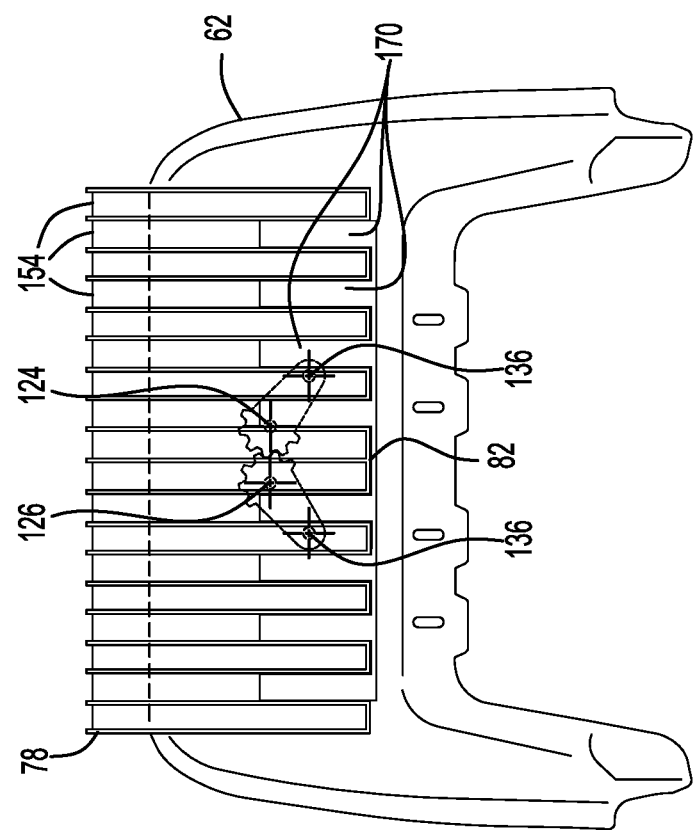
Figure 9A:
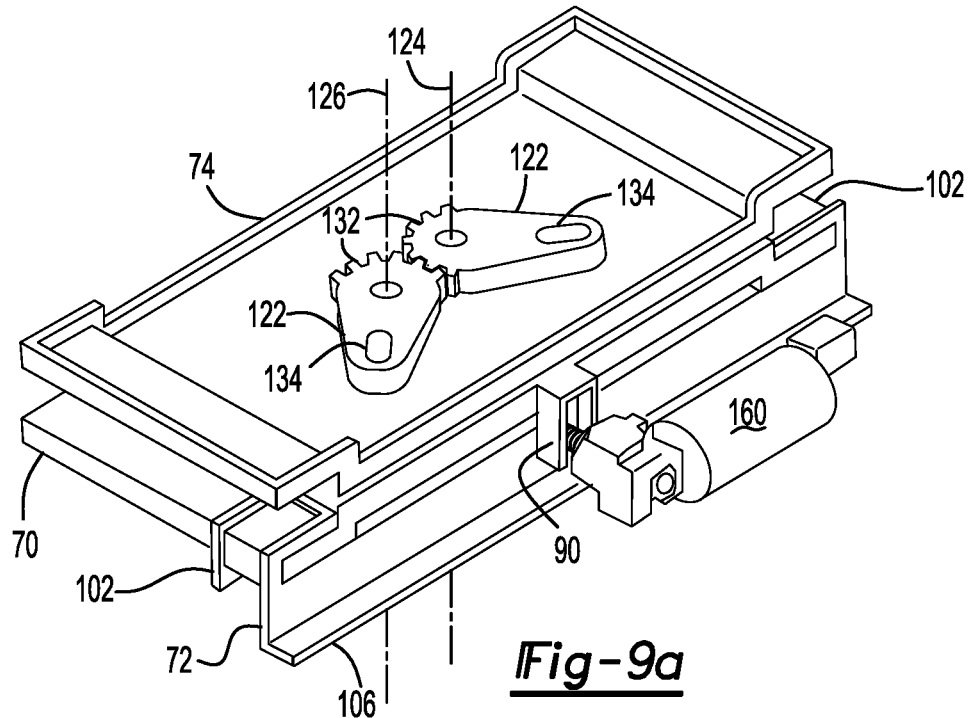
FIGS. 9a and 9b are top perspective views of a portion of the extendable thigh support in the retracted and extended positions, respectively, with a seat cushion attachment sled and the gap cover omitted for clarity.
Figure 9B:
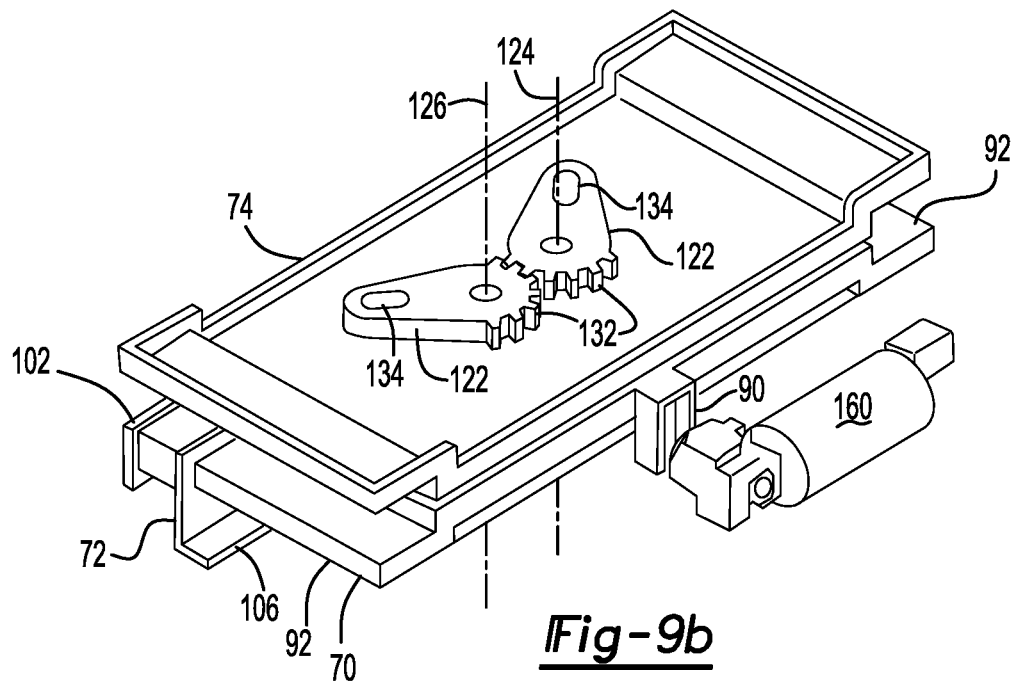
Figure 10A:
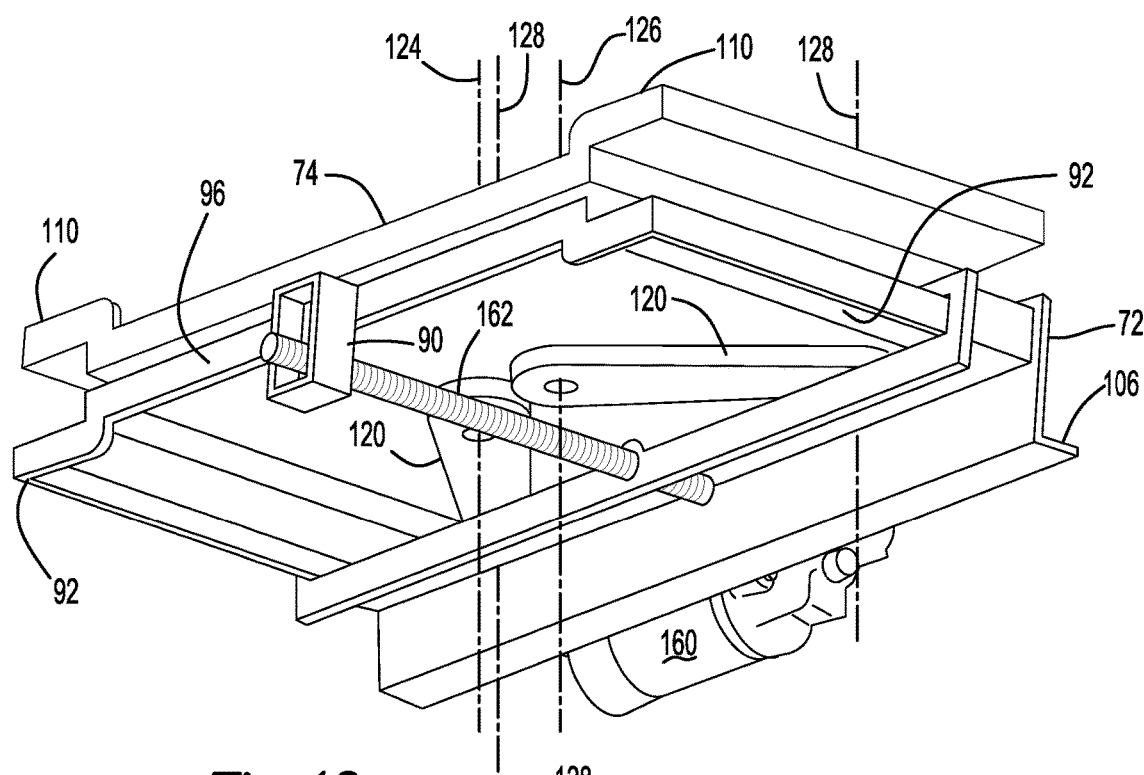
FIGS. 10a and 10b are bottom perspective views of a portion of the extendable thigh support in the retracted and extended positions, respectively.
Figure 10B:
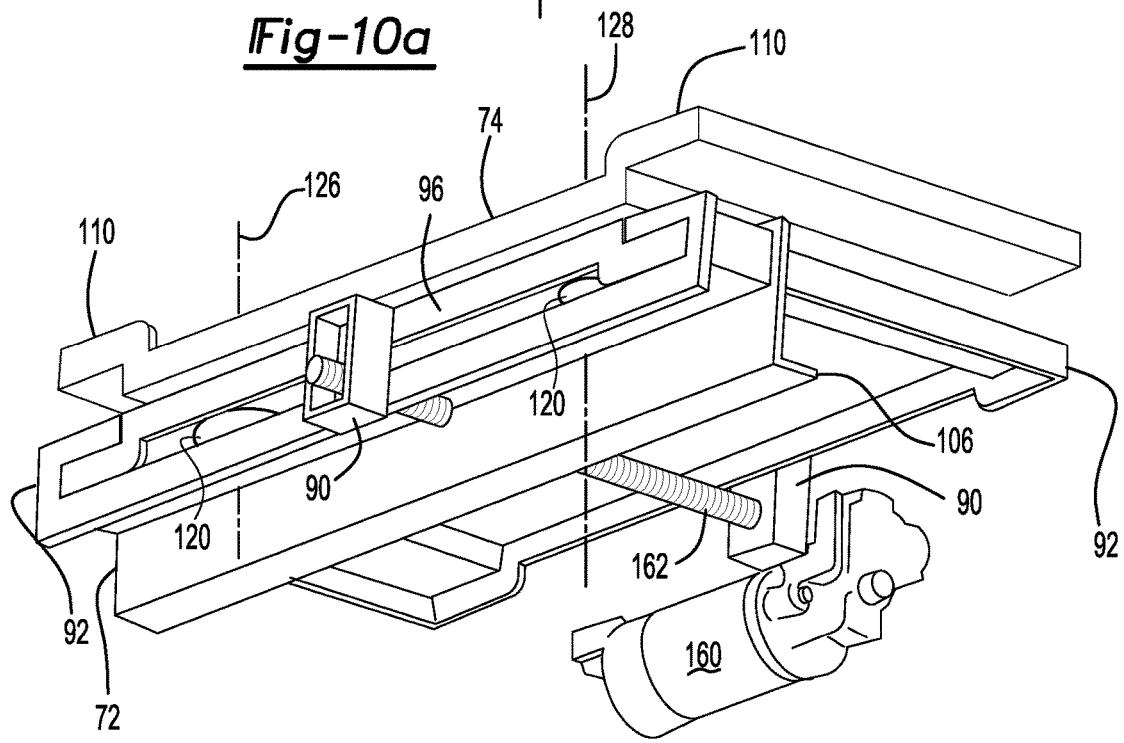

As is best shown with reference to FIGS. 9a and 9b, each upper lever 122 may have a first end and a second end. The first end may have a sector gear 132. The teeth of the sector gear 132 of one upper lever 122 may mesh with the teeth of the sector gear 132 of the other upper lever 122. The second end may be disposed opposite the first end and may be connected to the seat cushion extension sled 78. For example, the second end may define a slot 134 that may be elongated to extend radially with respect to the linkage axis associated with the upper lever 122. A pin or shaft may be received in the slot 134 and may couple the upper lever 122 to the seat cushion extension sled 78. The second end may be rotatably coupled to the seat cushion extension sled 78 along a third axis 136 along which the pin or shaft may extend as is best shown in FIGS. 8a and 8b. The slots 134 may permit the pin or shaft to move with respect to the slot 134 to facilitate smooth movement of the extendable thigh support 46.

Referring to FIGS. 2-4, 7a, and 7b, the seat cushion extension sled 78 may be moveably disposed on the upper guide 74 or may move with respect to the upper guide 74. The seat cushion extension sled 78 may be positioned between the seat bottom cushion 42 and the upper guide 74. As such, the seat bottom cushion 42 may be disposed on and may engage the seat cushion extension sled 78. In at least one configuration, the seat cushion extension sled 78 may include a sled body 140 and one or more sled hook portions 142.

The sled body 140 may engage and support the seat bottom cushion 42. In at least one configuration, the sled body 140 may have a first portion 150 and a second portion 152.

The first portion 150 may be generally disposed above the upper guide 74 and may engage and support the seat bottom cushion 42. The sled hook portions 142 may extend from the first portion 150. In at least one configuration, the first portion 150 may include a plurality of grooves 154. The grooves 154 may be configured as recesses in an upper surface of the seat cushion extension sled 78 that may face toward the seat bottom cushion 42. The grooves 154 may extend from a first end of the seat cushion extension sled 78 that may be disposed adjacent to the gap cover 82. Each groove 154 may receive a portion of the gap cover 82 as will be discussed in more detail below. In the configuration shown, the grooves 154 are shown as extending from the first end of the seat cushion extension sled 78 to an opposite end of the seat cushion extension sled 78 and thus extend across the second portion 152; however, it is contemplated that the grooves 154 may be localized in the first portion 150 and may not extend to the second portion 152.

The second portion 152 may extend from an end of the first portion 150. The second portion 152 may be disposed at the front of seat cushion extension sled 78 and may extend downward with respect to the first portion 150. For example, the second portion 152 may extend downward and around the front end of the seat pan 62 and the seat bottom frame 44 and may be continuously curved as is best shown in FIGS. 7a and 7b.

Referring to FIG. 4, one or more sled hook portions 142 may extend from the sled body 140. In the configuration shown, two sled hook portions 142 are provided. The sled hook portions 142 may extend from opposite lateral ends of the sled body 140 and may couple the seat cushion extension sled 78 to the upper guide 74. For instance, each sled hook portion 142 may wrap around a lateral side of the upper guide 74 and may be received in a corresponding guide track 110 of the upper guide 74. As such, the sled hook portions 142 may help secure the seat cushion extension sled 78 to the upper guide 74 and limit vertical movement of the seat cushion extension sled 78 with respect to the upper guide 74 while permitting linear movement of the seat cushion extension sled 78 with respect to the upper guide 74.

The actuator mechanism 80 may actuate the seat cushion extension sled 78. The actuator mechanism 80 may have any suitable configuration. For example, the actuator mechanism 80 may be a linear actuator and may be of any suitable type. In the configuration shown, actuator mechanism 80 includes an actuator 160 and a spindle 162.

The actuator 160 may be of any suitable type. For example, the actuator 160 may be an electrical, electric mechanical, pneumatic, or hydraulic actuator, or combinations thereof. In the configuration shown, the actuator 160 is depicted as an electrical motor. The actuator 160 may be mounted to a stationary component, such as the seat bottom frame 44 or a component that may not move with respect to the seat bottom frame 44, such as the lower guide 70. The actuator 160 may be positioned in various locations. For instance, the actuator 160 may be positioned near or at the rear end of the spindle 162, front end of the spindle 162, or at an intermediate position between the rear end and the front end of the spindle 162 depending on the actuator employed and the manner in which the actuator is operatively connected to the spindle 162.

The spindle 162 may be actuated by the actuator 160. For example, the actuator 160 may be configured to rotate the spindle 162 about a spindle axis. In at least one configuration, the spindle 162 may extend from the actuator 160 and may be rotatably disposed on the seat bottom frame 44 or the lower guide 70. For instance, the spindle 162 may be received in and may be rotatable with respect to the spindle mounts 90 of the lower guide 70. The spindle 162 may also extend into or through the spindle hole 104 of the attachment sled 72. The spindle 162 may be operatively connected to the attachment sled 72 such that rotation of the spindle 162 in a first rotational direction may actuate the attachment sled 72 in a first direction and away from the seat back 12 while rotation of the spindle 162 in a second rotational direction may actuate the attachment sled 72 in a second direction that may be disposed opposite the first direction. The spindle 162 and the attachment sled 72 may be operatively connected in any suitable manner, such as with mating threads, a nut, a ball screw connection, or the like.

Referring to FIGS. 4, 8a and 8b, the gap cover 82 may be fixedly mounted on the seat bottom frame 44. For example, the gap cover 82 may be fixedly mounted on the seat pan 62. The gap cover 82 may have a generally L-shaped cross section at one or more locations. The gap cover 82 may help support the seat bottom cushion 42. For example, the gap cover 82 may include one or more arms 170 that may support a portion of the seat bottom cushion 42 and extend toward the front of the seat bottom 14 and over the extendable thigh support 46. The arms 170 may extend over the first portion 150 of the seat cushion extension sled 78 and may be received in one or more corresponding grooves 154 of the first portion 150 when the seat cushion extension sled 78 is positioned in or between the retracted position and the extended position. As such, the arms 170 may extend across or cover the gap 172 (which is best shown in FIG. 8b) between the first end of the seat cushion extension sled 78 and the seat pan 62 that may be created or may expand when the extendable thigh support 46 is actuated from the retracted position shown in FIG. 8a to the extended position shown in FIG. 8b. Providing one or more arms 170 that are received in grooves 154 of the seat cushion extension sled 78 may help prevent the seat bottom cushion 42 from entering the gap 172 and may help inhibit pinching or tearing of the underside of the seat bottom cushion 42.

Operation of the extendable thigh support 46 will now be described in more detail. The extendable thigh support 46 may move between a retracted position and an extended position. The extendable thigh support 46 is shown in the retracted position in FIGS. 2, 3, 8a, 9a and 10a. The extendable thigh support 46 is shown in the extended position in FIGS. 9b and 10b.

The extendable thigh support 46 may move between the retracted position and the extended position in response to force provided by the actuator mechanism 80. For example, the extendable thigh support 46 may move from the retracted position to the extended position in response to force provided by the actuator mechanism 80, such as by operating the actuator 160 to rotate the spindle 162 in a first rotational direction. Rotation of the spindle 162 in the first rotational direction may actuate the attachment sled 72 toward the front side 96 of the lower guide 70 and toward the front of the seat bottom 14. In response, force may be transmitted from the attachment sled 72 to the lower levers 120. The lower levers 120 and the upper levers 122 may rotate together about their associated linkage axes 124, 126. Rotation of the upper levers 122 may cause the upper levers 122 to move from the position shown in FIG. 9a toward the position shown in FIG. 9b. The upper levers 122 may exert force on the seat cushion extension sled 78 via the pins or shafts that may interconnect the upper levers 122 to the seat cushion extension sled 78. In response, the seat cushion extension sled 78 may move forward toward the extended position and away from the seat back 12.

As is best shown in FIGS. 7a and 7b, the seat cushion extension sled 78 may slide under the seat bottom cushion 42 when the seat cushion extension sled 78 moves toward the extended position. In addition, the seat bottom trim cover 40 may slide with the seat bottom cushion 42 when the seat cushion extension sled 78 moves toward the extended position when the seat bottom trim cover 40 may be coupled to the attachment sled 72, such as with one or more retention features 48. For example, a distal end 180 of the seat bottom cushion 42 may move toward a distal end of the second portion 152 of the seat cushion extension sled 78 when the seat cushion extension sled 78 moves from the retracted position toward the extended position. Accordingly, the seat bottom trim cover 40 may not be stretched or may be stretched to a lesser degree than if the seat bottom trim cover 40 was coupled to a stationary component, such as the seat bottom frame 44 or the lower guide 70.

The extendable thigh support 46 may move from the extended position to the retracted position by reversing the sequence of operation. For example, the extendable thigh support 46 may move from the extended position to the retracted position and toward the seat back 12 in response to force provided by the actuator mechanism 80, such as by operating the actuator 160 to rotate the spindle 162 in a second rotational direction that may be disposed opposite the first rotational direction. Rotation of the spindle 162 in the second rotational direction may actuate the attachment sled 72 rearward and away from the front side 96 of the lower guide 70 and may reverse the actuation sequence described above, thereby actuating the seat cushion extension sled 78 toward the seat back 12. The actuation distance between the extended position and the retracted position may be any suitable length. For instance, the actuation distance may be between 30 and 70 cm as a non-limiting example. Moreover, the travel length of the attachment sled 72 may be twice the travel length of the seat cushion extension sled 78 or more in one or more embodiments.

Providing a seat assembly 10 with an extendable thigh support 46 as described above may allow seat assembly to be provided that may be less likely to accumulate dirt and may be easier to clean than a seat having separate trim covers for the thigh support cushion and the remainder of the seat bottom (which may create a gap in the seat bottom trim cover when the thigh support is extended) or in which the trim cover folds upon itself when the thigh support is retracted to provide sufficient trim cover length to allow the thigh support to be extended. A seat assembly having an extendable thigh support as previously described may also help avoid interference between moving and stationary components, such as between the actuator and the separate seat bottom cushion or mechanical components. In addition, the extendable thigh support may be more compact and may provide a smaller package space or a reduced package height, such as a package height of between 3 to 5 cm.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom having a seat bottom frame that includes a seat pan; and
   an extendable thigh support that is moveably disposed on the seat pan, the extendable thigh support including:
   a lower guide mounted to a bottom side of the seat pan;
   an upper guide mounted to a top side of the seat pan;
   an attachment sled that is moveably disposed on the lower guide;
   a seat cushion extension sled moveably disposed on the upper guide; and
   a linkage mechanism that operatively connects the attachment sled to the seat cushion extension sled, wherein at least a portion of the linkage mechanism is rotatable about a first linkage axis.

2. The seat assembly of claim 1 wherein the linkage mechanism includes:
   a lower lever that is rotatable about the first linkage axis with respect to the lower guide and is operatively connected to the attachment sled; and an upper lever that is rotatable about the first linkage axis with respect to the upper guide and is operatively connected to the seat cushion extension sled.

3. The seat assembly of claim 2 wherein the lower lever and the upper lever are rotatable together about the first linkage axis.

4. The seat assembly of claim 2 wherein a linkage that is rotatable about the first linkage axis extends through the upper guide, the seat pan, and the lower guide to couple the lower lever to the upper lever.

5. The seat assembly of claim 2 wherein the lower lever is rotatably coupled to the attachment sled along a second axis.

6. The seat assembly of claim 5 wherein the upper lever is rotatably coupled to the seat cushion extension sled along a third axis.

7. The seat assembly of claim 2 wherein movement of the attachment sled toward a front side of the lower guide rotates the lower lever and the upper lever about the first linkage axis and actuates the seat cushion extension sled away from a seat back.

8. The seat assembly of claim 2 wherein movement of the attachment sled away from a front side of the lower guide rotates the lower lever and the upper lever about the first linkage axis and actuates the seat cushion extension sled toward a seat back.

9. The seat assembly of claim 2 further comprising a second lower lever that is rotatable about a second linkage axis with respect to the lower guide and is operatively connected to the attachment sled and a second upper lever that is rotatable about the second linkage axis and operatively connects the lower lever to the seat cushion extension sled, wherein the second upper lever has a sector gear that meshes with a sector gear of the upper lever.

10. A seat assembly comprising:
a seat bottom having a seat bottom frame;
an extendable thigh support that is moveably disposed on the seat bottom frame, the extendable thigh support including:
a lower guide disposed on the seat bottom frame;
an attachment sled that is moveably disposed on the lower guide;
an upper guide disposed on the seat bottom frame;
a seat cushion extension sled that is disposed on the upper guide and is moveable between a retracted position and an extended position; and
a linkage mechanism that operatively connects the attachment sled to the seat cushion extension sled;
a seat bottom cushion that is disposed on the extendable thigh support;
a seat bottom trim cover that extends over the seat bottom cushion, wherein the seat bottom trim cover is attached to the attachment sled; and
a gap cover that is mounted to the seat bottom frame and has a plurality of arms that are received in grooves on the seat cushion extension sled.

11. The seat assembly of claim 10 wherein the seat cushion extension sled has a first portion that is disposed above the upper guide and a second portion that is disposed at a front of seat cushion extension sled and extends downward and around a front end of the seat bottom frame, wherein the seat bottom cushion slides across the first portion and the second portion when the seat cushion extension sled moves from the retracted position to the extended position.

12. The seat assembly of claim 11 wherein a distal end of the seat bottom cushion moves toward a distal end of the second portion when the seat cushion extension sled moves from the retracted position to the extended position.

13. The seat assembly of claim 10 wherein the linkage mechanism includes a lower lever that is rotatable about a first linkage axis with respect to the lower guide and is operatively connected to the attachment sled, and an upper lever that is rotatable about the first linkage axis with respect to the upper guide and is operatively connected to the seat cushion extension sled.

14. The seat assembly of claim 10 wherein the plurality of arms is received in the grooves when the seat cushion extension sled is in the retracted position and the extended position.

15. The seat assembly of claim 10 wherein the plurality of arms supports the seat bottom cushion to prevent the seat bottom cushion from entering a gap between the seat cushion extension sled and the seat bottom frame.

16. The seat assembly of claim 10 wherein the lower guide has first and second guide tracks that are disposed on opposite lateral sides of the lower guide and the attachment sled has first and second hook portions that receive the first and second guide tracks, respectively.

17. The seat assembly of claim 10 wherein the upper guide has first and second guide tracks that are disposed on opposite lateral sides of the upper guide and the seat cushion extension sled has first and second sled hook portions that receive the first and second guide tracks, respectively.

18. The seat assembly of claim 17 wherein the first and second guide tracks of the upper guide are spaced apart from the seat bottom frame and extend from a center portion of the upper guide that engages the seat bottom frame.

19. The seat assembly of claim 10 further comprising an actuator that is mounted to the lower guide that rotates a spindle to actuate the attachment sled.

20. The seat assembly of claim 19 wherein the spindle extends from the actuator through a first spindle mount in the lower guide, a spindle hole in the attachment sled, and a second spindle mount in the lower guide.

* * * * *